US011330641B2

(12) United States Patent
Chilla et al.

(10) Patent No.: US 11,330,641 B2
(45) Date of Patent: May 10, 2022

(54) 5G-NR CONNECTIVITY SUPPORT FOR IOT DEVICES

(71) Applicant: QUALCOMM Incorporated, San Diego, CA (US)

(72) Inventors: Rajashekar Chilla, San Diego, CA (US); Abhi Umeshkumar Shah, San Diego, CA (US); Lakshmi Bhavani Garimella Srivenkata, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/940,630

(22) Filed: Jul. 28, 2020

(65) Prior Publication Data

US 2021/0400737 A1 Dec. 23, 2021

Related U.S. Application Data

(60) Provisional application No. 63/042,945, filed on Jun. 23, 2020.

(51) Int. Cl.
*H04W 76/00* (2018.01)
*H04W 88/18* (2009.01)
*H04W 24/04* (2009.01)
*H04L 67/12* (2022.01)
*H04L 5/14* (2006.01)

(52) U.S. Cl.
CPC ............. *H04W 76/00* (2013.01); *H04L 5/14* (2013.01); *H04L 67/12* (2013.01); *H04W 24/04* (2013.01)

(58) Field of Classification Search
CPC ....... H04W 76/00; H04W 24/04; H04W 8/00; H04W 72/005; H04W 88/18; H04W 28/00; H04L 67/12; H04L 5/14; H04B 7/18569; H04B 7/18597
See application file for complete search history.

(56) References Cited

U.S. PATENT DOCUMENTS

| 2016/0037328 | A1* | 2/2016 | Raveendran | H04W 8/08 370/328 |
| 2017/0265173 | A1  | 9/2017 | Bailey et al. | |
| 2018/0139762 | A1* | 5/2018 | Cho | H04W 4/90 |
| 2018/0213495 | A1* | 7/2018 | Kim | H04W 56/001 |
| 2020/0092879 | A1* | 3/2020 | Wu | H04W 8/24 |
| 2020/0187209 | A1* | 6/2020 | Tamura | H04W 76/15 |

(Continued)

FOREIGN PATENT DOCUMENTS

WO 2019185118 A1 10/2019

OTHER PUBLICATIONS

International Search Report and Written Opinion—PCT/US2021/030270—ISA/EPO—dated Aug. 18, 2021, 17 pages.

(Continued)

*Primary Examiner* — Andrew Wendell
(74) *Attorney, Agent, or Firm* — The Marbury Law Group, PLLC

(57) ABSTRACT

Various aspects support 5G NR connectivity for Internet of Things (IoT) devices by adding one or more 5G NR network bearer support information elements to a connectivity monitoring object of the Lightweight Machine-to-Machine (LwM2M) protocol, and using 5G specific parameters to add support for 5G non-standalone (NSA) and/or 5G standalone (SA) objects to the LwM2M protocol.

13 Claims, 16 Drawing Sheets

(56) References Cited

U.S. PATENT DOCUMENTS

2020/0196233 A1    6/2020  Palanisamy et al.
2020/0229264 A1*   7/2020  Bangolae ................ H04W 4/70
2020/0403689 A1*  12/2020  Rofougaran ........... H04B 7/165
2021/0022073 A1*   1/2021  Kwok ................... H04W 76/15
2021/0067565 A1*   3/2021  Slovetskiy ........ H04W 52/0216
2021/0153166 A1*   5/2021  Kamat ................. H04W 48/14

OTHER PUBLICATIONS

Open Mobile Alliance: "Lightweight Machine to Machine Technical Specification: Core", Jun. 12, 2018 (Jun. 12, 2018), XP055606409, pp. 1-142, Retrieved from the Internet:URL:http://www.openmobilealliance.org/release/LightweightM2M/V1_1-20180612-C/OMA-TS-LightweightM2M__Core-V1_1-20180612-C.html [retrieved on Jul. 17, 2019] Chapters 6.2.1, 6.3, the whole document, 142 pages.

Open Mobile Alliance: "OMA Lightweight M2M (LwM2M)—Ready for 5G", OMA-WP-State_OF_the_LWM2M_Standard-20200114-C, Open Mobile Alliance—(OMA), 4330 La Jolla Village DR., Suite 110 San Diego, CA 92122, USA, Jan. 14, 2020, (Jan. 14, 2020), pp. 1-7, XP064193741, Retrieved from the Internet: URL: ftp/Public_documents/DM/LightweightM2M/Permanent_documents/ [retrieved-on Feb. 27, 2020] pp. 3-4.

* cited by examiner

Snippet of /13/x/0 from LwM2M registry web-site

| LWM2M Bearer Selection | 13 | 1.0 | 1.0 |
|---|---|---|---|
| Object URN | | Instances | Mandatory |
| urn:oma:lwm2m:pma:13 | | Single | Optional |

Resource Definitions

| ID | Name | Operations | Instances | Mandatory | Type | Range or Enumeration | Description |
|---|---|---|---|---|---|---|---|
| 0 | Preferred Communication Bearer | RW | Multiple | Optional | Integer | 8 bit | Used in network selection and, if applicable in subsequent mobility management procedures:<br><br>0: auto connect<br>1: 3GPP PS Preferred<br>2: 3GPP PS GSM (GPRS) preferredA (including EC-GSM-IoT)<br>3: 3GPP PS UMTS preferred<br>4: 3GPP PS LTE preferred<br>5: 1xEV-DO preferred (1)<br>6: 3GPP CS preferred (1)<br>7: WLAN preferred<br>8: Ethernet preferred (1)<br>9: DSL preferred (1)<br>10: Bluetooth preferred (1)<br>11: WiMAX Preferred (1)<br>12: 3GPP PS LTE with CIoT EPS optimisations, User Plane preferred (2)<br>13: 3GPP PS LTE with CIoT EPS optimisations, Control Plane preferred (2)<br>14: 3GPP PS NB-IoT Control Plane optimisations preferred (2)<br>15: 3GPP PS NB-IoT User Plane optimisations preferred (2)<br>16: 100: Reserved for future use<br><br>The Preferred Communications Bearer resource specifies the preferred communication bearer that the LWM2M Client is requested to use for connection to the LWM2M Server. If multiple preferred communications bearers are specified, the priority order is reflected by the resource instance order. E.g. the bearer which appears first in the list of resource instances is to have higher priority over the rest of available bearers. The LWM2M Client SHOULD used the preferred bearers with higher priority first if they are available. If none of indicated preferred bearers is available, the LWM2M Client SHOULD wait until one of them... |

FIG. 4C

5G-NR Connectivity Object

Object definition

This is a device management object that should be used for 5G-NR capable devices.

| Name | Object Version | Object Version | Instances | Mandatory | | |
|---|---|---|---|---|---|---|
| 5G-NR Connectivity | xxxx | | Multiple | Optional | | |
| urn:oma:mo:ext:5g-nr:x.x | | | | | | |

Resource Definitions

| ID | Name | Operations | Instances | Mandatory | Type | Range or Enumeration | Units | Description |
|---|---|---|---|---|---|---|---|---|
| 0 | Name | R | Single | Mandatory | | | | Indicates the connectivity option in Non-Standalone (NSA) mode<br><br>\| Connectivity Option \| Core Network \| Master RAT \| Secondary RAT \|<br>\| 1 \| EPC \| LTE \| - \|<br>\| 3 \| EPC \| LTE \| NR \|<br>\| 2 \| EPC \| NR \| - \|<br>\| 4 \| 5GC \| NR \| - \|<br>\| 5 \| 5GC \| NR \| eLTE \|<br>\| 7 \| 5GC \| eLTE \| NR \| |
| 1 | NR Band Support available | R | Single | Mandatory | Integer | | | Indicates the NR Bands supported by UE in NSA mode |
| 2 | NR Band attached | R | Single | Optional | Integer | | | Indicates the NR Band over which UE is attached currently in SA cell in NSA mode |
| 3 | S-NSSAI | R | Single | Optional | Integer | | | Indicates the Single - Network Slice Selection Assistance Information for 5G Standalone mode<br>0 = eMBB<br>1 = URLLC<br>2 = MIoT<br>3 = Custom |
| 4 | DNN Name | R | Single | Optional | String | | | Data Network Name in cases of Network Slicing Resources in a 5G SA (PDP/PDN) Cellular Network |

FIG. 4D-1

| 5G-NR Connectivity Object (Contd.) | | | | | | |
|---|---|---|---|---|---|---|
| 5 | PDU Session Id | R | Single | Optional | Integer | 1..15 | Indicates the PDU Session ID over which LwM2M session is established for 5G SA (FDD/TDD) Cellular Network. |
| 6 | SSC Mode | R | Single | Optional | Integer | 1..3 | Indicates the Session and Service Continuity mode for 5G SA (FDD/TDD) Cellular Network. |
| 7 | PDU Session Type | R | Single | Optional | Integer | | Indicates the type of PDU session over which LwM2M connection is established for 5G SA (FDD/TDD) Cellular Network. 1 = IPv4 2 = IPv6 3 = IPv4v6 4 = Unstructured 5 = Ethernet 6 = Reserved |
| 8 | 5QI | R | Single | Optional | Integer | | Indicates the 5G QoS Identifier for 5G SA (FDD/TDD) Cellular Network. 1-9,65,66,67,69,70,75,79,80,81,82,83,84,85 = Standard 128 to 254 = Operator specific 0..255 = Reserved Remaining = Spare |
| 9 | SDAP Enablement | R | Single | Optional | Integer | | Indicates whether SDAP is enabled or not for 5G SA (FDD/TDD) Cellular Network. 0 = In UL only 1 = In DL Only 2 = In UL and DL both |
| 10 | QFI | R | Single | Optional | Integer | 1..63 | Indicates the QoS Flow Indentifier for 5G SA (FDD/TDD) Cellular Network. |
| 11 | Session AMBR | R | Single | Optional | Integer | 1..25 | Indicates the Session Aggregate Maximum Bit Rate as per the 5G 3GPP Spec for 5G SA (FDD/TDD) Cellular Network. |

FIG. 4D-2

| 5G-NR Connectivity Object (Contd.) | | | | | | |
|---|---|---|---|---|---|---|
| 12 | APN-AMBR | R | Single | Optional | Integer | The Aggregate Maximum Bitrate which is applicable to a given APN over which LwMBM session is established for 5G SA (FDD/TDD) Cellular Network. |
| 13 | Reflective QOS | R | Single | Optional | Boolean | Indicates the QoS at NAS layer for 5G SA (FDD/TDD) Cellular Network. 0 = Disabled 1 = Enabled |
| 14 | Access Stratum Reflective QoS | R | Single | Optional | Boolean | Indicates the QoS for Access Stratum (RRC) for 5G SA (FDD/TDD) Cellular Network. 0 = Absent 1 = Present |
| 15 | P-CSCF Address Index | R | Single | Optional | Integer | Index for the P-CSCF address for 5G SA (FDD/TDD) Cellular Network. |
| 16 | PDU session Authentication | R | Single | Optional | Integer | Indicates the Authentication type for for PDU Session PDU session Authentication 0 = Primary 1 = Secondary 2 = Both |
| 17 | PLMN ID | R | Single | Optional | Integer | Indicates the PLMN ID over which UE is currently attached for 5G SA (FDD/TDD) Cellular Network. |

FIG. 4D-3

| 5G-NR Connectivity Object (Contd.) | | | | | | | |
|---|---|---|---|---|---|---|---|
| 19 | LADN Support | R | Single | Optional | Boolean | | Indicates whether LADN (Local Area Data Network) is supported or not for 5G SA (FDD/TDD) Cellular Network.<br><br>0 = Not Supported<br>1 = Supported |
| 19 | Access type Preference | R | Single | Optional | Boolean | | Indicates the Access Type preference for 5G SA (FDD/TDD) Cellular Network.<br><br>0 = 3GPP<br>1 = Non-3GPP |
| 20 | Integrity Protection on DRB | R | Single | Optional | Integer | | Indicates the support for Integrity Protection on Data Radio Bearer for 5G SA (FDD/TDD) Cellular Network.<br><br>0 = Disabled<br>1 = Enabled |

FIG. 4D-4

5G-NR CONNECTIVITY SUPPORT FOR IOT DEVICES

RELATED APPLICATIONS

This application claims the benefit of priority to U.S. Provisional Application No. 63/042,945, entitled "5G-NR Connectivity Support For IOT Devices" filed Jun. 23 2020, the entire contents of which are hereby incorporated by reference for all purposes.

BACKGROUND

The Open Mobile Alliance (OMA) is a standards body that defines a Lightweight Machine-to-Machine (LwM2M) protocol. The LwM2M protocol defines various LwM2M objects that may include one or more resource definition information elements (IE). For example, the LwM2M protocol defines a security object (Object ID=0), a server object (Object ID=1), an access control object (Object ID=2), a device object (Object ID=3), a connectivity monitoring object (Object ID=4), and a firmware update object (Object ID=5). The connectivity monitoring object includes a network bearer IE, an available network bearer IE, a radio signal strength IE, a link quality IE, an Internet protocol (IP) addresses IE, a link utilization IE, an access point name (APN) IE, a cell id IE, a serving mobile network code (SMNC) IE, and a serving mobile country code (SMCC) IE. These information elements allow for the monitoring of parameters related to network connectivity and/or for the communication network or wireless device to communicate up-to-date values for the wireless device's current connections.

SUMMARY

Various aspects enable methods of supporting Fifth Generation (5G) New Radio (NR) connectivity for Internet of Things (IoT) devices, which include indicating in a connectivity monitoring object of the Lightweight Machine-to-Machine (LwM2M) protocol transmitted to a base station whether an IoT device is capable of receiving 5G NR and receiving 5G NR network bearer support information from the base station. In some aspects the connectivity monitoring object transmitted to the base station may include a network bearer information element and an available network bearer information element. In some aspects receiving 5G NR network bearer support information from the base station may include receiving information identifying a network bearer type or a communication session that can be established with the base station. In some aspects indicating in the connectivity monitoring object of the LwM2M protocol transmitted to the base station may include adding or including a 5G-NR cellular network information element in the transmitted connectivity monitoring object. In some aspects indicating in the connectivity monitoring object of the LwM2M protocol transmitted to the base station may include adding or including in the connectivity monitoring object at least one or more of a 5G-NR frequency division duplexing (FDD) cellular network information element or a 5G-NR time division duplexing (TDD) cellular network information element.

Some aspects may include methods for supporting Fifth Generation (5G) New Radio (NR) connectivity for Internet of Things (IoT) devices that include receiving from an IoT device one or more 5G NR network bearer support information elements in a connectivity monitoring object of the Lightweight Machine-to-Machine (LwM2M) protocol, transmitting 5G specific parameters to the IoT providing support for 5G non-standalone (NSA) or 5G standalone (SA) objects to the LwM2M protocol, and providing 5G NR service to the IoT device. In some aspects, the connectivity monitoring object received from the IoT device may include a network bearer information element and an available network bearer information element. In some aspects, the 5G NR network bearer support information may include information identifying a network bearer type or a communication session that can be established with the base station. In some aspects, receiving from an IoT device one or more 5G NR network bearer support information elements in a connectivity monitoring object of the LwM2M protocol may include receiving 5G-NR cellular network information element in the connectivity monitoring object. In some aspects, receiving from an IoT device one or more 5G NR network bearer support information elements in a connectivity monitoring object of the LwM2M protocol may include receiving at least one or more of a 5G-NR frequency division duplexing (FDD) cellular network information element or a 5G-NR time division duplexing (TDD) cellular network information element.

Further aspects include an IoT device having a processor configured with processor-executable instructions to perform operations of any of the IoT device methods summarized above. Various aspects include an IoT device having means for performing functions of any of the IoT device methods summarized above. Various aspects include a non-transitory processor-readable medium having stored thereon processor-executable instructions configured to cause a processor of an IoT device to perform operations of any of the IoT device methods summarized above.

Further aspects include a base station having a processor configured with processor-executable instructions to perform operations of any of the base station methods summarized above. Various aspects include a base station having means for performing functions of any of the base station methods summarized above. Various aspects include a non-transitory processor-readable medium having stored thereon processor-executable instructions configured to cause a processor of a base station to perform operations of any of the base station methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIGS. 4C and 4D-1-4D-4 are charts illustrating example object and resource definitions for connectivity objects for use in a method for supporting 5G NR connectivity for IoT devices according to various embodiments.

DETAILED DESCRIPTION

Figure 1:
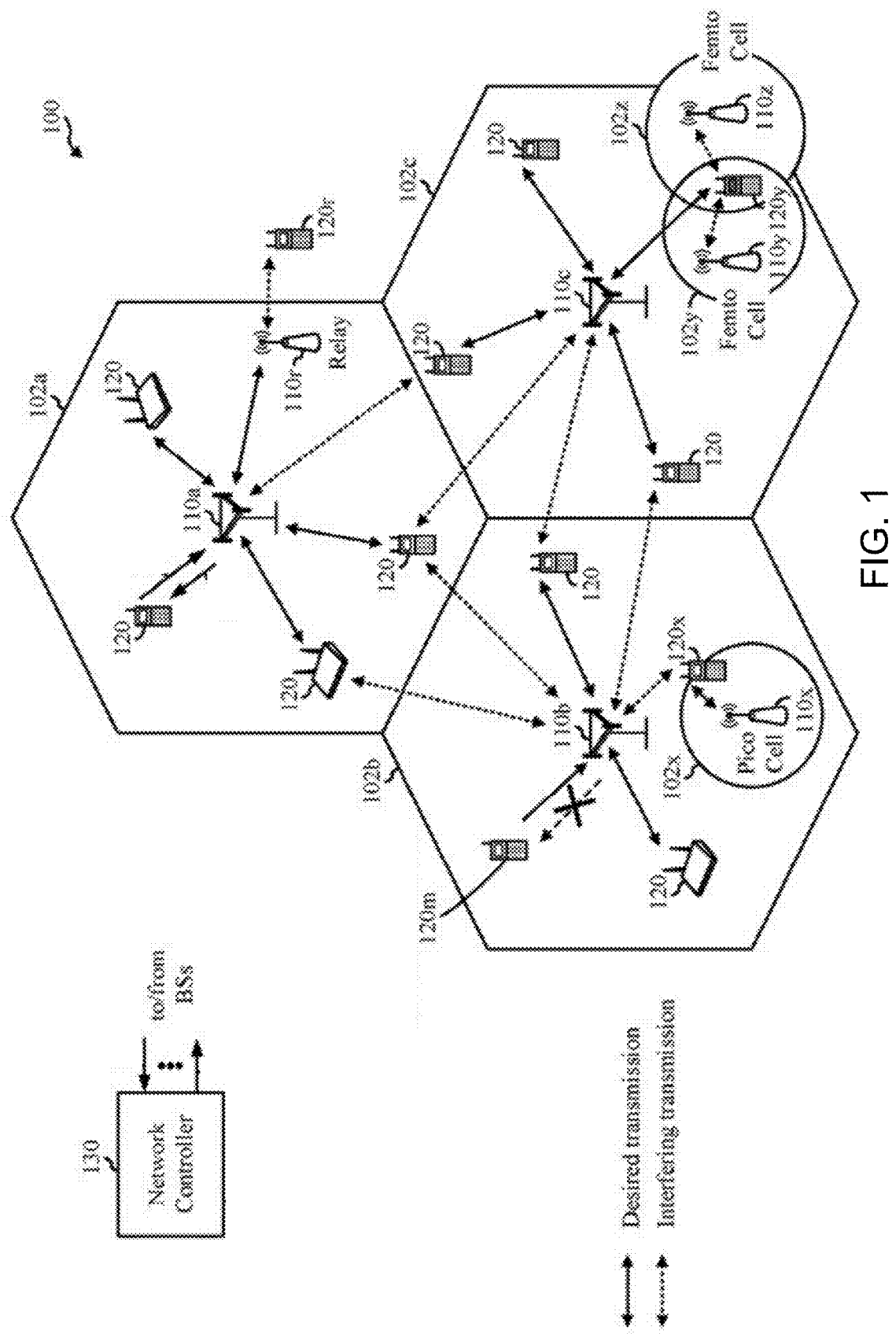
FIG. 1 is a system block diagram conceptually illustrating an example telecommunications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "IoT device" is used herein to refer to any of a variety of devices including a processor and transceiver for communicating with other devices or a network. For ease of description, examples of IoT devices are described as communicating via radio frequency (RF) wireless communication links, but IoT devices may communicate via wired or wireless communication links with another device (or user), for example, as a participant in a communication network, such as the IoT. Such communications may include communications with another wireless device, a base station (including a cellular communication network base station and an IoT base station), an access point (including an IoT access point), or other wireless devices.

Various embodiments may be implemented in any device, system or network that is capable of transmitting and receiving RF signals according to any of the Institute of Electrical and Electronics Engineers (IEEE)16.11 standards, or any of the IEEE 802.11 standards, the Bluetooth standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, or a system utilizing 3G, 4G or 5G, or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

The term "multicore processor" is used herein to refer to a single integrated circuit (IC) chip or chip package that contains two or more independent processing cores (e.g., central processing unit (CPU) core, internet protocol (IP) core, graphics processor unit (GPU) core, etc.) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As noted above, the LwM2M protocol defines various LwM2M objects that each include one or more resource definition information elements (IE). For example, the connectivity monitoring object (Object ID=4) includes a network bearer IE, an available network bearer IE, a radio signal strength IE, a link quality IE, an Internet protocol (IP) addresses IE, a link utilization IE, an access point name (APN) IE, a cell id IE, a serving mobile network code (SMNC) IE, a serving mobile country code (SMCC) IE, a SignalSNR IE, and a location area code (LAC) IE. While these information elements (IEs) may be adequate for the monitoring network connectivity parameters in LTE, CDMA, NB-IoT and other similar legacy systems, they may not be sufficient for supporting the device management of 5G-NR capable chipsets or for supporting network connectivity and/or communicating up-to-date connection values in 5G NR and future networks.

Various embodiments include system information as well as IoT devices and network elements (e.g., a gNodeB) configured to better support device management of 5G-NR capable chipsets and IoT devices, better support establishing or maintaining network connectivity, and/or better support communicating up-to-date connection values in 5G NR and future networks. Various embodiments include adding one or more 5G NR network bearer support IEs to the connectivity monitoring object (Object ID=4). In various embodiments, IoT devices and network elements may be configured to support 5G RAT based device management by adding support for 5G non-standalone (NSA) and/or 5G standalone (SA) objects with 5G specific parameters.

In some embodiments, adding 5G NR network bearer support IEs to the connectivity monitoring object (Object ID=4) may include adding information identifying the 5G-NR network bearer types and/or the LwM2M communication sessions that can be established to the network bearer and/or available network bearer IEs of the connectivity monitoring object.

In some embodiments, the IoT devices and network elements may be configured to add a 5G-NR cellular network IE to the connectivity monitoring object (Object ID=4). In some embodiments, the IoT devices and network elements may be configured to add a 5G-NR frequency division duplexing (FDD) cellular network IE and/or a 5G-NR time division duplexing (TDD) cellular network IE to the connectivity monitoring object (Object ID=4). In some embodiments, the IoT devices and network elements may be configured to support 5G RAT based device management by adding support for 5G non-standalone (NSA) and/or 5G standalone (SA) objects with 5G specific parameters.

An IoT device may determine an identity of the network (e.g., a Public Land Mobile Network (PLMN) or another suitable network) with which the IoT device is in communication, and scan the characteristics of one or more connectivity objects that are linked in a server object based on the determined network identity. In some embodiments, the connectivity objects may each include a connectivity option IE, a band support available IE, a band attached IE, a single network slice selection assistance information (S-NSSAI) IE, a data network name (DNN) IE, a protocol/packet data unit (PDU) session id IE, a session and service continuity (SSC) mode IE, a PDU session type IE, 5G quality-of-service identifier (5QI) IE, a service data adaptation protocol (SDAP) enablement IE, quality-of-service flow identifier (QFI) IE, a session aggregate maximum bit rate (AMBR) IE, an APN-AMBR IE, a reflective quality-of-service (QOS) IE, an access stratum reflective QoS IE, a proxy call session control function (P-CSCF) address index IE, a PDU session authentication IE, PLMN id IE, a local area data network (LADN) support IE, an access type preference IE, and/or an integrity protection on data radio bearer (DRB) IE.

The connectivity option IE may identify a connectivity option (e.g., 1-7, etc.) that identifies or is associated with a core network, a master radio access technology (RAT), and/or a secondary RAT. For example, connectivity options "1" and "3" may identify evolved packet core (EPC) as the core network, and connectivity options 2," "4," "5" and "7" may identify 5G core (5GC) as the core network. Connectivity option "3" may further identify new radio (NR) as the secondary RAT. Connectivity options "2" and "4" may identify new radio (NR) as the master RAT, and connectivity options "5" and "7" may identify eLTE as the master RAT. Connectivity option "4" may identify eLTE as the secondary RAT. Connectivity option "7" may identify NR as the secondary RAT. The band support available IE may identify the NR bands supported by IoT device (in SA or NSA mode). The band attached IE may indicate the NR Band over which the IoT device is attached currently in 5G cell (in SA or NSA mode).

The S-NSSAI IE may indicate the S-NSSAI element for 5G SA mode, such as enhanced mobile broadband (eMBB), ultra-reliable low latency communications (URLLC), massive IOT (mIoT), custom, etc.). The DNN IE may identify the data network name in case the network bearer resource is a 5G SA (FDD/TDD) cellular network. The PDU session id IE may identify the PDU session over which LwM2M session is established for the 5G SA (FDD/TDD) cellular network. The SSC mode IE may identify the SSC mode (e.g., SSC Mode 1, SSC Mode 2, SSC Mode 3, etc.) for the 5G SA (FDD/TDD) cellular network. The PDU session type IE may identify the type of PDU session (e.g., IPv4, IPv6, IPv4v6, Unstructured, Ethernet, Reserved, etc.) over which LwM2M connection is established for the 5G SA (FDD/TDD) cellular network.

The 5QI IE may identify the 5G QoS (e.g., standard, operator specific, reserved, spare, etc.) for the 5G SA (FDD/TDD) cellular network. The SDAP enablement IE may identify whether SDAP is enabled (e.g., in uplink only, in downlink only, or in both uplink and downlink) for the 5G SA (FDD/TDD) cellular network. The QFI IE may identify the QoS flow for the 5G SA (FDD/TDD) cellular network. The session AMBR IE may identify the session aggregate maximum bit rate as per the 5G 3GPP Spec for the 5G SA (FDD/TDD) cellular network. The APN-AMBR IE may identify the aggregate maximum bit rate that is applicable to a given APN over which LwM2M session is established for the 5G SA (FDD/TDD) cellular network.

The reflective QOS IE may identify the QoS at non-access stratum (NAS) layer (e.g., disabled, enabled, etc.) for the 5G SA (FDD/TDD) cellular network. The access stratum reflective QoS IE may identify the QoS for Access Stratum (e.g., absent, present, etc.) for the 5G SA (FDD/TDD) cellular network. The P-CSCF address index IE may identify an index for the P-CSCF address for the 5G SA (FDD/TDD) cellular network. The PDU session authentication IE may identify the authentication type (e.g., primary, secondary, both, etc.) for the PDU session. The PLMN ID IE may identify the PLMN over which wireless device is currently attached for the 5G SA (FDD/TDD) cellular network. The LADN support IE may identify whether LADN is supported for the 5G SA (FDD/TDD) cellular network. The access type preference IE may identify the access type preference (e.g., 3GPP, Non-3GPP, etc.) for the 5G SA (FDD/TDD) cellular network. The integrity protection on DRB IE may identify whether support for integrity protection on the data radio bearer is enabled for 5G SA (FDD/TDD) cellular network.

Some embodiments may include methods for supporting Fifth Generation (5G) New Radio (NR) connectivity for Internet of Things (IoT) devices, which may include adding one or more 5G NR network bearer support information elements to a connectivity monitoring object of the Lightweight Machine-to-Machine (LwM2M) protocol, using 5G specific parameters to add support for 5G non-standalone (NSA) and/or 5G standalone (SA) objects to the LwM2M protocol, and providing 5G radio access technology (RAT) based device management. In some embodiments, the connectivity monitoring object may include a network bearer information element and an available network bearer information element. In some embodiments, adding one or more 5G NR network bearer support information elements to the connectivity monitoring object of the LwM2M protocol may include adding information identifying a network bearer type or a communication session that can be established to the network bearer information element or the available network bearer information element. In some embodiments, adding one or more 5G NR network bearer support information elements to the connectivity monitoring object of the LwM2M protocol may include adding a 5G-NR cellular network information element to a connectivity monitoring object. In some embodiments, adding one or more 5G NR network bearer support information elements to the connectivity monitoring object of the LwM2M protocol may include adding to the connectivity monitoring object at least one or more of a 5G-NR frequency division duplexing (FDD) cellular network information element or a 5G-NR time division duplexing (TDD) cellular network information element.

FIG. 1 illustrates an example wireless network 100, such as a new radio (NR) or 5G network, in which embodiments of the present disclosure may be performed. For example, an IoT device equipped with the system in a package (SIP) 200 illustrated in FIG. 2 may include a 5G modem processor that is configured to send and receive information via the wireless network 100.

In the example illustrated in FIG. 1, the wireless network 100 includes a number of base stations 110 and other network entities. A base station may be a station that communicates with wireless devices including IoT devices. Each base station 110 may provide communication coverage for a particular geographic area. In 3rd Generation Partnership Project (3GPP), the term "cell" can refer to a coverage area of a Node B and/or a Node B subsystem serving this coverage area, depending on the context in which the term is used. In new radio (NR) or Fifth Generation (5G) network systems, the term "cell" and eNB, Node B, 5G NB, access point (AP), NR base station, NR base station, or transmission and reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular RAT and may operate on one or more frequencies. A frequency may also be referred to as a carrier, a frequency channel, etc. Each frequency may support a single RAT in a given geographic area in order to avoid interference between wireless networks of different RATs. Wireless networks 100 supporting IoT device communications may use or support a number of different RATs, including for example, LTE/Cat. M, NB-IoT, Global System for Mobile Communications (GSM), and Voice over Long Term Evolution (VoLTE) RATs as well as other RATs (e.g., 5G). Wireless networks 100 may use a different APN for each different RAT.

A base station may provide communication coverage for a macro cell, a pico cell, a femto cell, and/or other types of cell. A macro cell may cover a relatively large geographic area (e.g., several kilometers in radius) and may allow unrestricted access by IoT devices with service subscription. A pico cell may cover a relatively small geographic area and may allow unrestricted access by IoT devices with service subscription. A femto cell may cover a relatively small geographic area (e.g., a home) and may allow restricted access by IoT devices having association with the femto cell (e.g., IoT devices in a Closed Subscriber Group (CSG), IoT devices for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base station for the femto cells 102y and 102z, respectively. A base station may support one or multiple (e.g., three) cells. Further, base stations may support communications on multiple networks using multiple RATs, such as Cat.-M1, NB-IoT, GSM, and VoLTE.

The wireless network 100 may also include relay stations. A relay station is a station that receives a transmission of data and/or other information from an upstream station (e.g., a base station or an IoT device) and sends a transmission of the data and/or other information to a downstream station (e.g., an IoT device or a base station). A relay station may also be a wireless device that relays transmissions for other wireless devices including IoT devices. In the example shown in FIG. 1, a relay station 110r may communicate with the base station 110a and an IoT device 120r in order to facilitate communication between the base station 110a and the IoT device 120r. A relay station may also be referred to as a relay base station, a relay, etc. Further, relay stations may support communications on multiple networks using multiple RATs, such as Cat.-M1, NB-IoT, GSM, and VoLTE.

The wireless network 100 may be a heterogeneous network that includes base stations of different types, e.g., macro base station, pico base station, femto base station, relays, etc. These different types of base stations may have different transmit power levels, different coverage areas, and different impact on interference in the wireless network 100. For example, macro base station may have a high transmit power level (e.g., 20 Watts) whereas pico base station, femto base station, and relays may have a lower transmit power level (e.g., 1 Watt).

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operations.

A network controller 130 may be coupled to a set of base stations and provide coordination and control for these base stations. The network controller 130 may communicate with the base stations 110 via a backhaul. The base stations 110 may also communicate with one another, e.g., directly or indirectly via wireless or wireline backhaul.

The IoT devices 120 (e.g., 120x, 120y, etc.) may be dispersed throughout the wireless network 100, and each IoT device may be stationary or mobile. Some IoT devices may be considered evolved or machine-type communication (MTC) devices or evolved MTC (eMTC) devices. MTC and eMTC IoT devices include, for example, robots, drones, remote devices, sensors, meters, monitors, location tags, etc., that may communicate with a base station, another device (e.g., remote device), or some other entity. A wireless node may provide, for example, connectivity for, or to, a network (e.g., a wide area network such as Internet or a cellular network) via a wired or wireless communication link.

In FIG. 1, a solid line with double arrows indicates desired transmissions between an IoT device and a serving base station, which is a base station designated to serve the IoT device on the downlink and/or uplink. A dashed line with double arrows indicates interfering transmissions between the IoT device and a base station.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal full frame transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

A NR base station (e.g., eNB, 5G Node B, Node B, transmission reception point (TRP), access point (AP)) may correspond to one or multiple base stations. NR cells may be configured as access cell (ACells) or data only cells (DCells). For example, the radio access network (RAN) (e.g., a central unit or distributed unit) may configure the cells. DCells may be cells used for carrier aggregation or dual connectivity, but not used for initial access, cell selection/reselection, or handover. NR base stations may transmit downlink signals to IoT devices indicating the cell type. Based on the cell type indication, the IoT device may communicate with the NR base station. For example, the IoT device may determine NR base stations to consider for cell selection, access, handover (HO), and/or measurement based on the indicated cell type.

Figure 2:
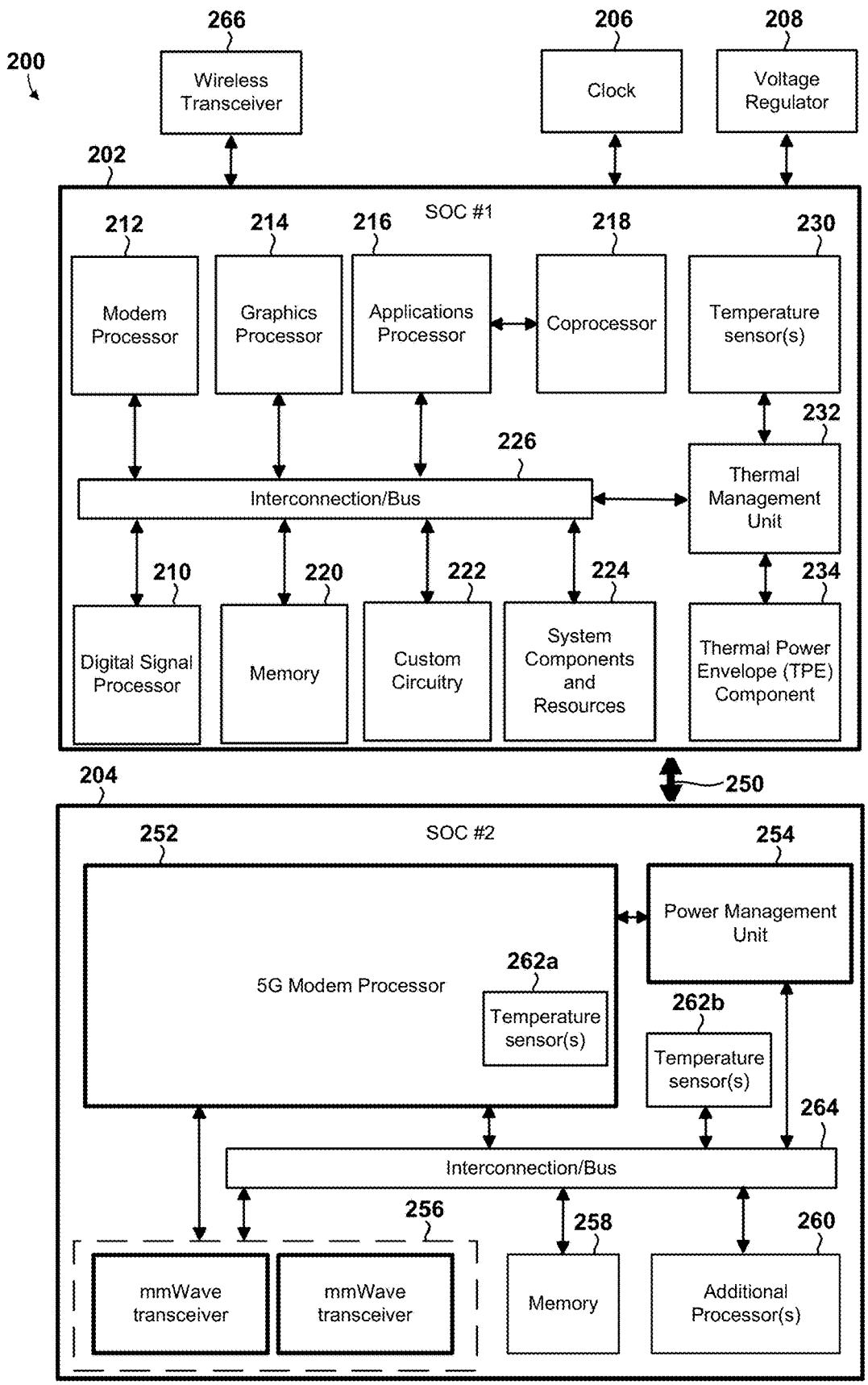
FIG. 2 is a component block diagram illustrating components of example IoT devices suitable for implementing various embodiments.

The various embodiments may be implemented on IoT devices equipped with any of a number of single processor and multiprocessor computer systems, including a system-on-chip (SOC) or system in a package (SIP). FIG. 2 illustrates an example computing system or SIP 200 architecture that may be used in IoT devices (e.g., the IoT devices 120) implementing the various embodiments. With reference to FIGS. 1 and 2, the SIP 200 may provide all of the processing, data storage and communication capabilities required to support the mission or functionality of a given IoT device. The same SIP 200 may be used in a variety of different types of IoT devices (e.g., smart meters, smart appliances, sensors, etc.) with device-specific functionality provided via programming of one or more processors within the SIP. Further, the SIP 200 is an example of components that may be implemented in a SIP used in IoT devices and more or fewer components may be included in a SIP used in IoT devices without departing from the scope of the claims.

The example SIP 200 illustrated in FIG. 2 includes two SOCs 202, 204, a wireless transceiver 266, a clock 206, and a voltage regulator 208. In some embodiments, the first SOC 202 operates as central processing unit (CPU) of the IoT device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

In the example illustrated in FIG. 2, the first SOC 202 includes a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 includes a 5G modem processor 252, a power management unit 254, temperature sensors 262a 262b, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on an IoT device. The system components and resources 224 and/or custom circuitry 222 may also include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processors 252, 260 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

Figure 3:
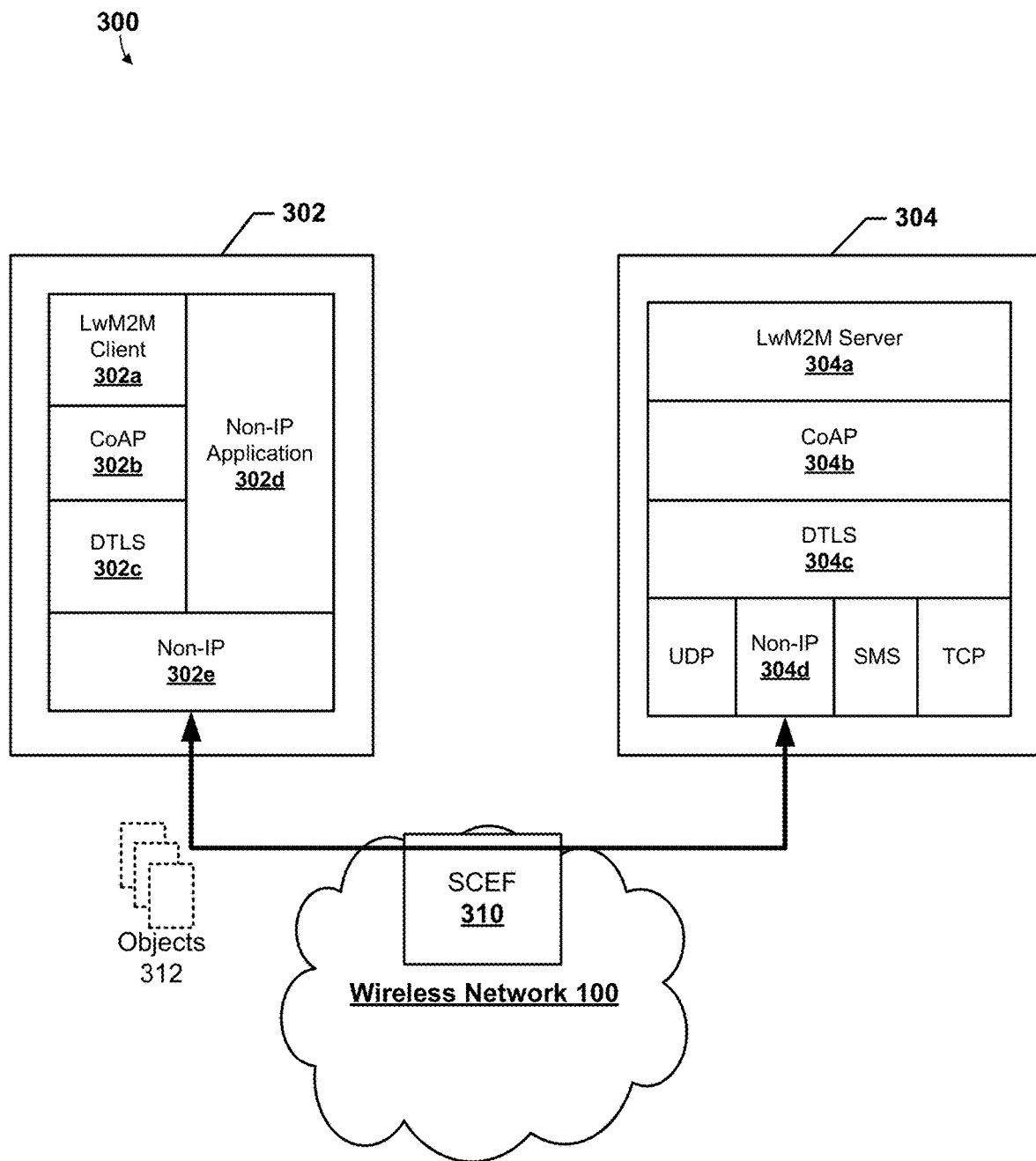
FIG. 3 is a block diagram illustrating an example Non-IP Data Delivery (NIDD) data call architecture suitable for use with various embodiments.

FIG. 3 illustrates an example Non-IP Data Delivery (NIDD) data call architecture 300 suitable for use with various embodiments. With reference to FIGS. 1-3, the architecture 300 shows an example of a NIDD data call between an IoT device 302 (e.g., IoT devices 120) and a server 304. The architecture 300 is discussed with reference to LwM2M, but LwM2M is merely an example of an application of a NIDD data call used to illustrate aspects of the architecture 300. Other protocols, such as other OMA protocols may be used to establish a NIDD data call and the architecture 300 may apply to non-LwM2M NIDD data calls. The IoT device 302 and the server 304 may be configured to communicate using NIDD. As an example, the IoT device 302 may be a LwM2M client device. As an example, the server 304 may be a LwM2M server, such as a bootstrap server as defined by LwM2M or an LwM2M server that is not a bootstrap server. The server 304 may be an application server.

A Service Capability Exposure Function (SCEF) 310 enables NIDD communication between the IoT device 302 and the server 304. The SCEF 310 enables devices such as the IoT device 302 and the application server 304 to access certain communication services and capabilities, including NIDD. The SCEF 310 may support Relative Duplex Distance (RDD). While illustrated as in communication with one server 304, the SCEF 310 may route traffic to multiple servers each identified by their own respective destination port when using the Reliable Data Service (RDS) protocol. In this manner, a single NIDD data call through the SCEF 310 may include multiplexed traffic intended for multiple different destinations.

In some embodiments, the IoT device 302 may be configured with an LwM2M client 302a that uses the LwM2M device management protocol. The LwM2M device management protocol defines an extensible resource and data model. The LwM2M client 302a may employ a service-layer transfer protocol such as Constrained Application Protocol (CoAP) 302b to enable, among other things reliable and low overhead transfer of data. The IoT device 302 may employ a communication security protocol such as Datagram Transport Layer Security (DTLS) 302c. DTLS in particular may provide security for datagram-based applications. One such application may be a Non-IP Application 302d. The Non-IP Application 302d may utilize a non-IP protocol 302e to structure non-IP communications.

In some embodiments, the server 304 may be configured with an LwM2M server 304a, a transfer protocol such as CoAP 304b, and a security protocol such as DTLS 304c. The application server 304 may be configured to utilize a variety of communication protocols, such as non-IP protocol 304d, as well as other communication protocol such as UDP, SMS, TCP, and the like.

As an example, the IoT device 302 may be a constrained device having a very small power storage device and may be configured for an operational life of years. Typical protocols for establishing IP data bearers are notoriously power hungry. In contrast, NIDD may enable the IoT device 302 to communicate small amounts of data by a control plane, rather than a user plane, without the use of an IP stack. NIDD may have particular application in Cat.-M1, NB-IoT and CIoT communications to enable constrained devices to communicate via a cellular network and send or receive small amounts of data per communication (e.g., in some cases, on the order of hundreds of bytes, tens of bytes, or smaller). NIDD may enable the IoT device 302 to embed a small amount of data in a container or object 312 without use of an IP stack, and to send the container or object 312 to the server 304 via the SCEF 310. Similarly, the IoT device 302 may receive containers or objects 312 that define services and capabilities of the network 100 the IoT device 302 may be connected to enable the IoT device 302 to reach the SCEF 310 and server 304. For example, such containers or objects 312 that define services and capabilities may include various OMA objects, such as an APN connection profile object (Object ID 11), a LwM2M server object (Object ID 1), a LwM2M security object (Object ID 0), etc.

In some embodiments, the IoT device 302 may support RDS in a NIDD data call. The IoT device 302 may multiplex uplink traffic for different servers 304 by sending the uplink traffic with a pair of source and destination port numbers and an Evolved Packet System (EPS) bearer ID. The SCEF 310 may receive uplink traffic from the IoT device 302 and may route the uplink traffic to the appropriate server, such as server 304 or any other server, based on the destination port number indicated for the uplink traffic.

Figure 4A:
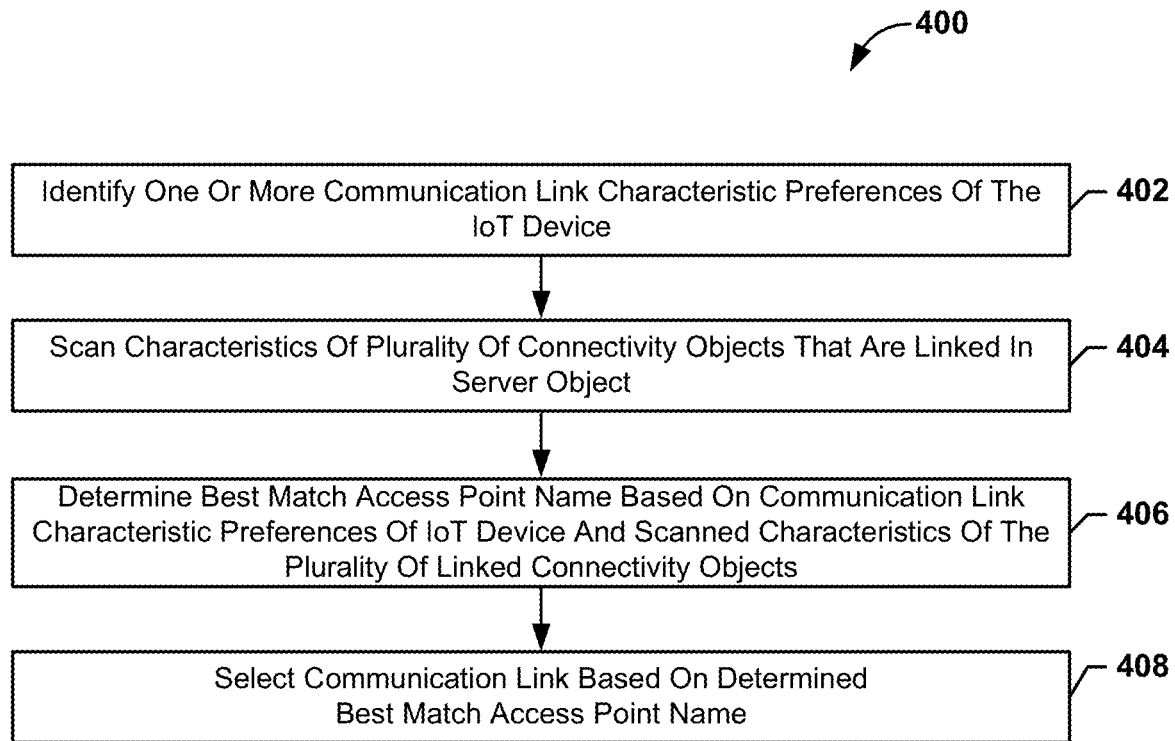
FIG. 4A is a process flow diagram illustrating a method for supporting 5G NR connectivity for IoT devices according to various embodiments.
Figure 4B:
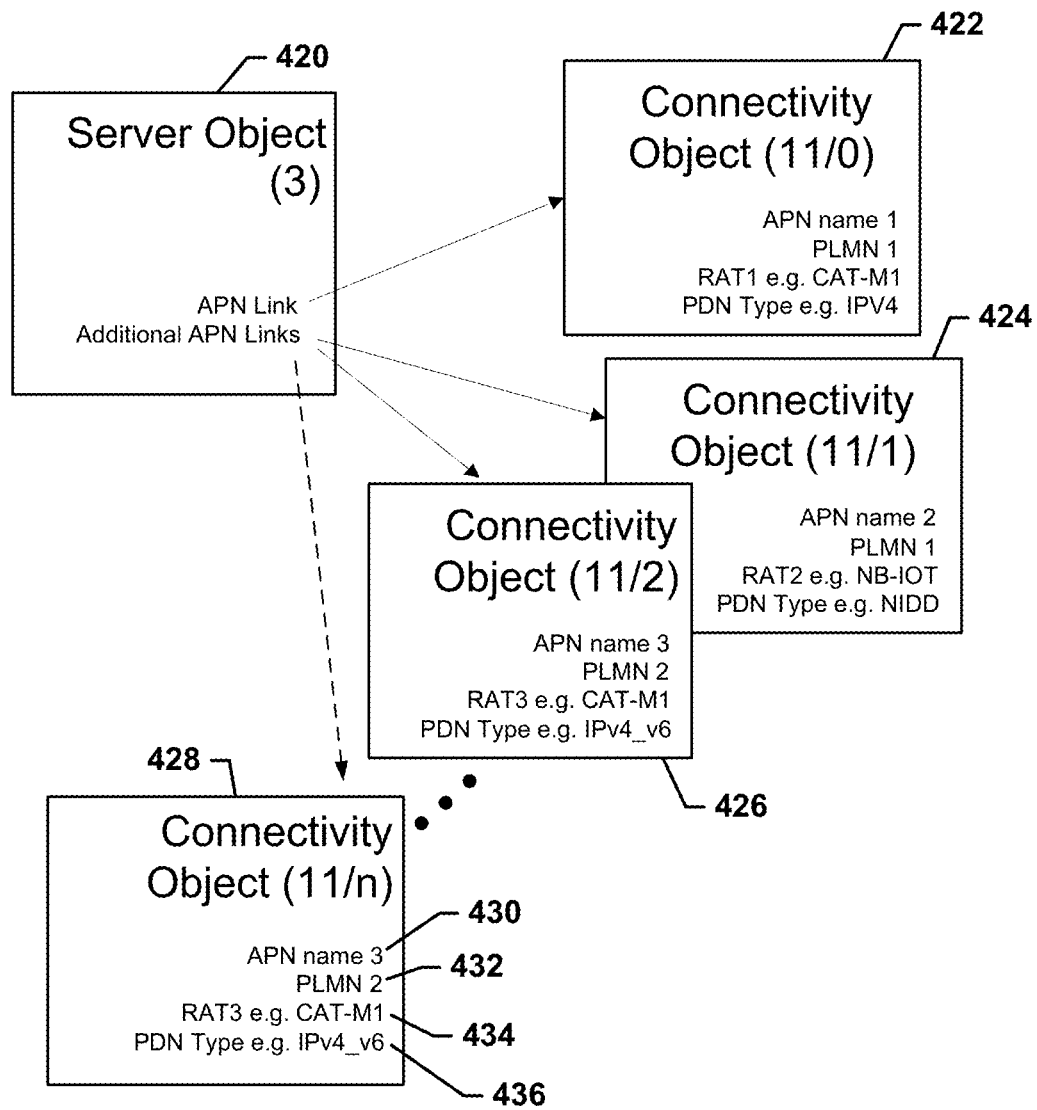
FIG. 4B is a data structure block diagram illustrating information elements and interrelations of connectivity objects for use in a method for supporting 5G NR connectivity for IoT devices according to various embodiments.

FIG. 4A is a process flow diagram, FIG. 4B illustrates a component block diagram, and FIG. 4C is a chart illustrating, illustrating a method 400 and aspects of components used in the method 400 according to some embodiments. With reference to FIGS. 1-4C, the method 400 may be implemented in hardware components and/or software components of an IoT device (e.g., the IoT devices 120) the operation of which may be controlled by one or more processors (e.g., the processors 212, 216, 252 or 260).

In block 402, the processor may identify one or more communication link characteristic preferences of the IoT device. For example, the processor may identify a network identifier of the network with which the IoT device is currently connected (such as a PLMN), a current RAT, a preferred network binding type (e.g., IP or NIDD), or another suitable preference. In some embodiments, the server object may include a preferred bearer resource indication. In some embodiments, identifying one or more communication link characteristic preferences of the IoT device may include determining a listing order of communication link characteristics of one or more of the connectivity objects.

In block 404, the processor may scan characteristics of a plurality of connectivity objects that are linked in a server object. For example, referring to FIG. 4B, a server object 420 may include a plurality of links to connectivity objects, such as the connectivity objects 422, 424, 426, and 428.

In some embodiments, the connectivity objects may include instances of Object 11. In some embodiments, the server object links may include APN links. In some embodiments, the characteristics of the connectivity objects may include an APN name 430, a PLMN identifier 432, a RAT identifier 434, a packet data network (PDN) type 436, and other suitable characteristics.

Referring to FIG. 4C, in some embodiments, the connectivity objects may include one or more instances of Object 13. In some embodiments, the Object 13 instance(s) may include preference and/or priority information 440, such as the example information in the Description column illustrated in FIG. 4C. In some embodiments, the Object 13 may include information indicating a preferred RAT. In some embodiments, the Object 13 may include information indicating a RAT priority indication. In some embodiments, the Object 13 may include a link to one or more Object 11 instances at a LwM2M client. In other embodiments, the server object, Object 1, may include a link to an Object 13 instance.

Object 13 may help the processor choose the particular PLMN/network, and Object 13/x/0 may allow for the selection of the preferred bearer for LwM2M communication. Object 13/x/0 may allow the user to choose amongst the various bearers such as LTE, Ethernet, Bluetooth etc. In some embodiments, Object 13/x/0 may include an added NR information element using a reserved value, such as 16.

Referring back to FIG. 4A, in block 406, the processor may determine a best match access point name based on the communication link characteristic preferences of the IoT device and the scanned characteristics of the plurality of linked connectivity objects. For example, the processor may determine that one or more of the communication link characteristic preferences match one or more of the scanned characteristics of the linked connectivity objects. In some embodiments, the processor may determine the best match access point name based on a number of matches between the communication link characteristic preferences and the scan characteristics of the linked connectivity objects.

In block 408, the processor may select a communication link based on the determined best match access point.

As discussed above, various embodiments include methods for supporting device management in 5G NR connectivity for IoT devices, which may include indicating in a connectivity monitoring object of the LwM2M protocol transmitted to a base station whether an IoT device is capable of receiving 5G NR and receiving 5G NR network bearer support information from the base station. FIGS. 4D-1 through 4D-4 illustrate an example 5G NR connectivity object that could be transmitted to a base station to indicate whether an IoT device is capable of receiving 5G NR. The 5G NR connectivity object may include various resource definitions, such as a connectivity option, NR band support available, NR band attached, S-NSSAI, DNN Name, PDU session ID, SSC mode, PDU Session Type, 5QI, SDAP Enablement, QFI, Session AMBR, APN-AMBR, Reflective QOS, Access Stratum Reflective QoS, P-CSCF Address Index, PDU session Authentication, PLMN ID, LADN support, Access type preference, and Integrity protection on DRB, example descriptions of which are provided in the Description columns illustrated in FIGS. 4D-1 through 4D-4.

Figure 5A:
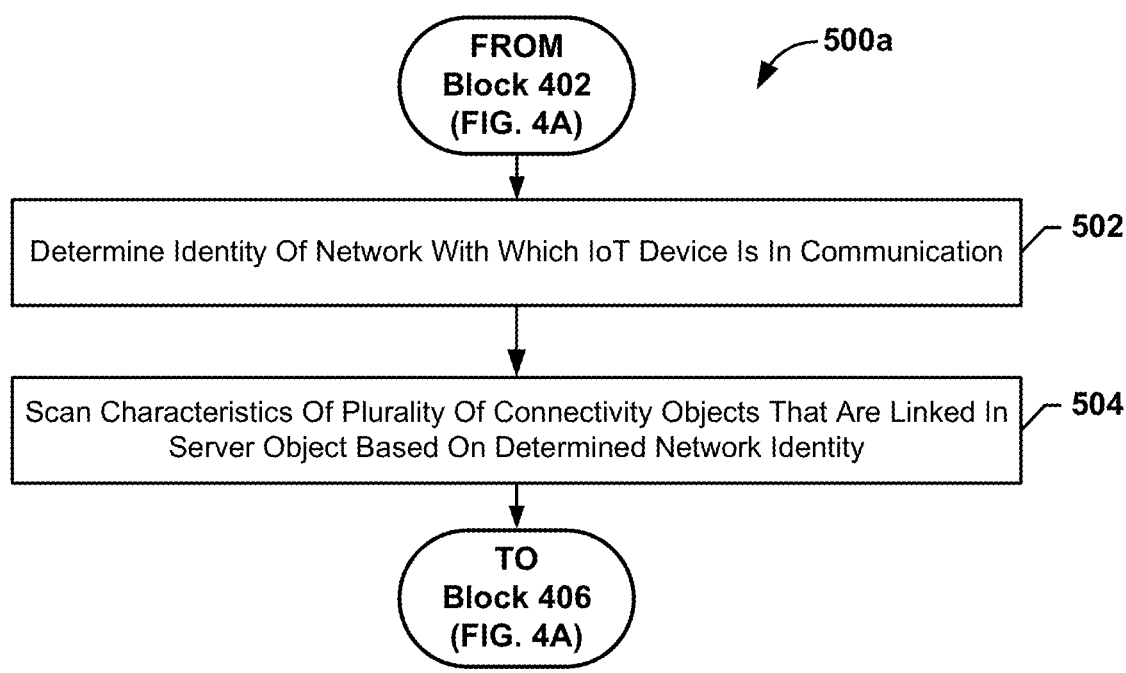
FIG. 5A-5D are process flow diagrams illustrating operations that may be performed as part of the method for supporting 5G NR connectivity for IoT devices in accordance with some embodiments.

FIG. 5A is a process flow diagram illustrating operations 500a that may be performed as part of the method 400 by an IoT device. With reference to FIGS. 1-5A the operations 500a may be implemented in hardware components and/or software components of an IoT device (e.g., the IoT devices 120) the operation of which may be controlled by one or more processors (e.g., the processors 212, 216, 252 or 260).

Referring to FIG. 5A, in some implementations following the operations of block 402 of the method 400 (FIG. 4A), the processor may determine an identity of a network with which the IoT devices and communication in block 502. For example, the processor may determine a PLMN identity or another suitable network identity. In block 504, the processor may scan characteristics of the plurality of connectivity objects that are linked in the server object based on the determined network identity. The processor may proceed to perform the operations of block 406 of the method 400 (FIG. 4A).

Figure 5B:
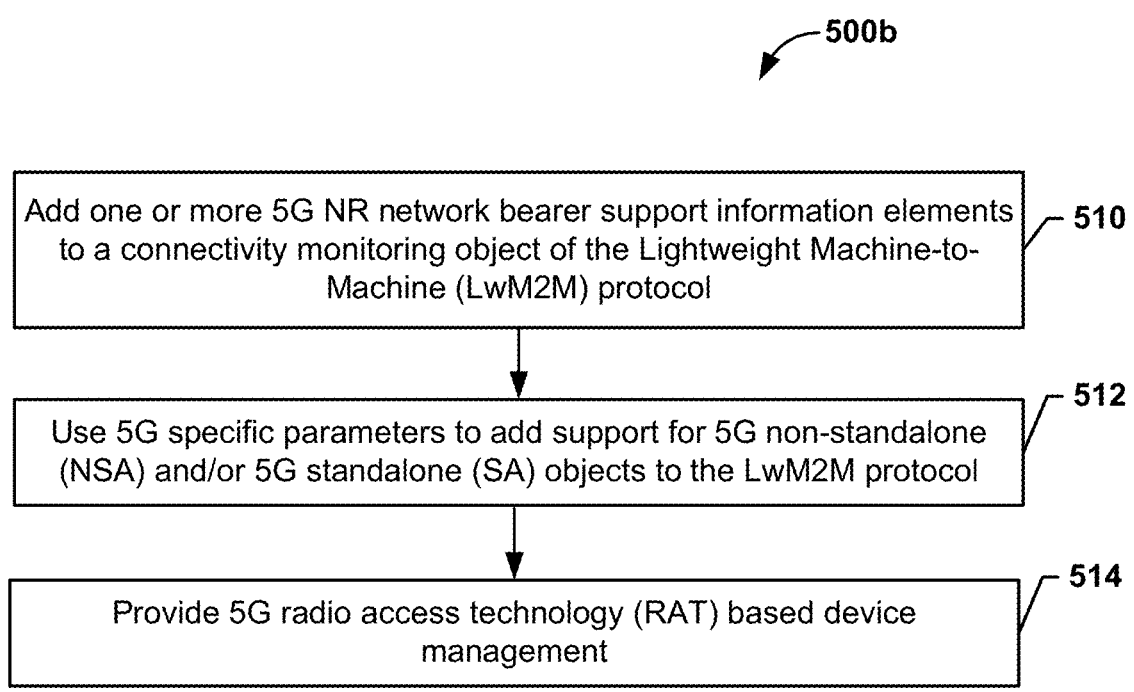

FIG. 5B is a process flow diagram illustrating operations 500b that may be performed by an IoT device and/or a base station for supporting 5G NR connectivity for Internet of Things (IoT) devices. With reference to FIGS. 1-5B the operations 500b may be implemented in hardware components and/or software components of an IoT device (e.g., the IoT devices 120) and/or a base station (e.g., base stations 110) the operation of which may be controlled by one or more processors (e.g., the processors 212, 216, 252 or 260).

Referring to FIG. 5B, in block 510 a processor in the IoT device and/or base station may add one or more 5G NR network bearer support information elements to a connectivity monitoring object of the Lightweight Machine-to-Machine (LwM2M) protocol. In some embodiments, the connectivity monitoring object may include a network bearer information element and an available network bearer information element. In some embodiments, adding one or more 5G NR network bearer support information elements to the connectivity monitoring object of the LwM2M protocol may include adding information identifying a network bearer type or a communication session that can be established to the network bearer information element or the available network bearer information element. In some embodiments, adding one or more 5G NR network bearer support information elements to the connectivity monitoring object of the LwM2M protocol may include adding a 5G-NR cellular network information element to the connectivity monitoring object. In some embodiments, adding one or more 5G NR network bearer support information elements to the connectivity monitoring object of the LwM2M protocol may include adding to the connectivity monitoring object at least one or more of a 5G-NR frequency division duplexing (FDD) cellular network information element or a 5G-NR time division duplexing (TDD) cellular network information element. In block 512, the processor may use 5G specific parameters to add support for 5G non-standalone (NSA) and/or 5G standalone (SA) objects to the LwM2M protocol. In block 514, the processor may provide 5G radio access technology (RAT) based device management.

Figure 5C:
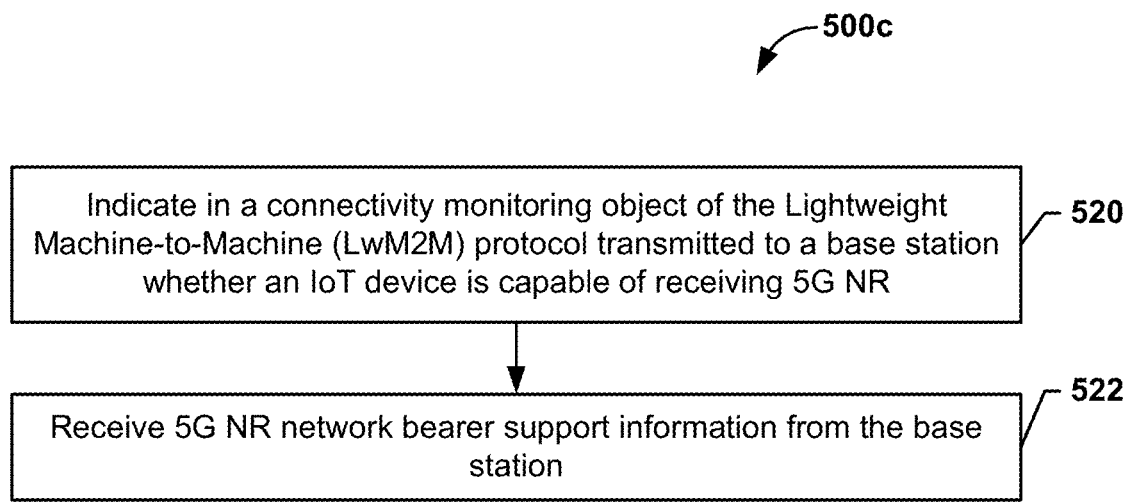

FIG. 5C is a process flow diagram illustrating operations 500c that may be performed by an IoT device for supporting 5G NR connectivity for Internet of Things (IoT) devices. With reference to FIGS. 1-5C the operations 500c may be implemented in hardware components and/or software components of an IoT device (e.g., the IoT devices 120) the operation of which may be controlled by one or more processors (e.g., the processors 212, 216, 252 or 260).

Referring to FIG. 5C, in block 520 a processor in the IoT device (e.g., the IoT devices 120) may indicate in a connectivity monitoring object of the Lightweight Machine-to-Machine (LwM2M) protocol transmitted to a base station whether an IoT device is capable of receiving 5G NR. This indication may be provided by including a value assigned in the connectivity monitoring object to indicating 5G NR network capability of the IoT device. In some embodiments the connectivity monitoring object transmitted to the base station in block 520 may include a network bearer information element and an available network bearer information element, and the 5G NR network bearer support information received from the base station in block 522 may include information identifying a network bearer type or a communication session that can be established with the base station. In some embodiments indicating in the connectivity monitoring object of the LwM2M protocol in block 520 may include adding or including a 5G-NR cellular network information element in the transmitted connectivity monitoring object. In some embodiments indicating in the connectivity monitoring object of the LwM2M protocol in block 520 may include adding or including in the connectivity monitoring object at least one or more of a 5G-NR frequency division duplexing (FDD) cellular network information element or a 5G-NR time division duplexing (TDD) cellular network information element. In some embodiments, the processor may include the value 8 to indicate 5G NR cellular network capability. In some embodiments, the processor may include the value 8 to indicate 5G NR FDD cellular network capability or 9 to indicate 5G NR TDD cellular network capability.

In block 522, the processor may receive 5G NR network bearer support information from the base station consistent with the capability indicated in the connectivity monitoring object in block 520.

Figure 5D:
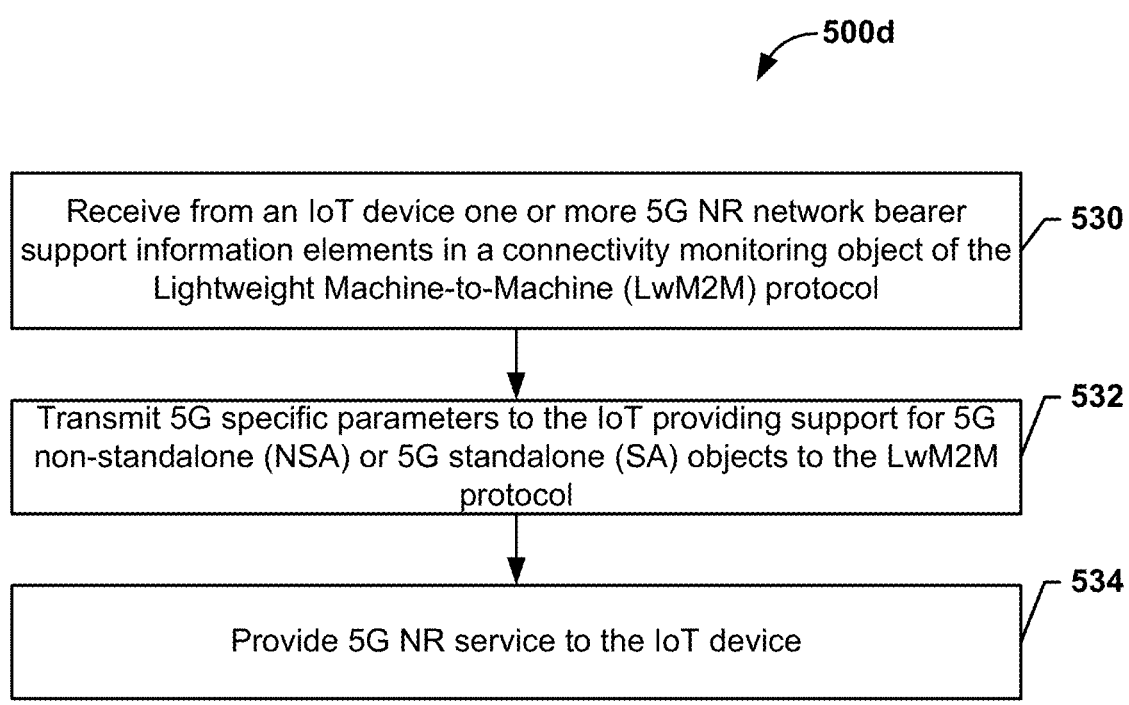

FIG. 5D is a process flow diagram illustrating operations 500d that may be performed by a base station for supporting 5G NR connectivity for Internet of Things (IoT) devices. With reference to FIGS. 1-5D the operations 500d may be implemented in hardware components and/or software components of a base station (e.g., base stations 110) the operation of which may be controlled by one or more processors.

Referring to FIG. 5D, in block 530 the base station may receive from an IoT device one or more 5G NR network bearer support information elements in a connectivity monitoring object of the Lightweight Machine-to-Machine (LwM2M) protocol. As noted above for block 522, the connectivity monitoring object received from the IoT device may include a network bearer information element and an available network bearer information element. In some embodiments, the 5G NR network bearer support information may include information identifying a network bearer type or a communication session that can be established with the base station. In some embodiments, receiving the 5G NR network bearer support information elements in a connectivity monitoring object of the LwM2M protocol in block 530 may include receiving 5G-NR cellular network information element in the connectivity monitoring object. In some embodiments, receiving from an IoT device one or more 5G NR network bearer support information elements in a connectivity monitoring object of the LwM2M protocol in block 530 may include receiving at least one or more of a 5G-NR frequency division duplexing (FDD) cellular network information element or a 5G-NR time division duplexing (TDD) cellular network information element. In some embodiments, the received network bearer support information element in a connectivity monitoring object may include the value 8 to indicate 5G NR cellular network capability. In some embodiments, the received network bearer support information element in a connectivity monitoring object may include the value 8 to indicate 5G NR FDD cellular network capability or 9 to indicate 5G NR TDD cellular network capability.

In block 532, the base station may transmit 5G specific parameters to the IoT providing support for 5G non-standalone (NSA) or 5G standalone (SA) objects to the LwM2M protocol consistent with the received network bearer support information element in a connectivity monitoring object. In block 534, the base station may provide 5G NR service to the IoT device.

Figure 6:
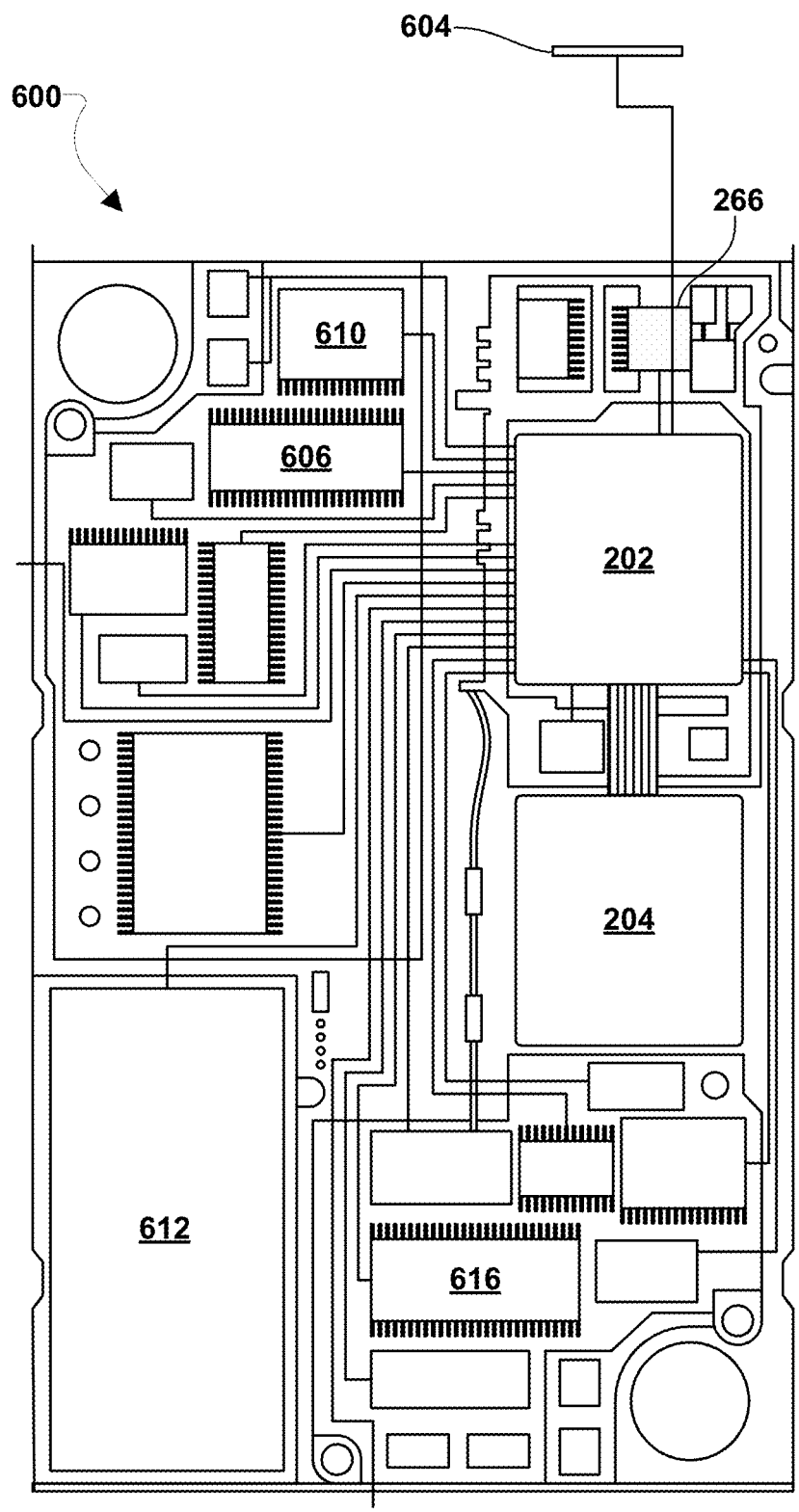
FIG. 6 is a component block diagram of an IoT device suitable for use in accordance with various embodiments.

The various embodiments may be implemented on a variety of IoT devices, an example in the form of a circuit board for use in a device is illustrated in FIG. 6. With reference to FIGS. 1-6, an IoT device 600 may include a first SOC 202 (e.g., an SOC-CPU) coupled to a second SOC 204 (e.g., a 5G capable SOC) and a wireless transceiver 266. The first and second SOCs 202, 204 may be coupled to internal memory 606. Additionally, the IoT device 600 may include or be coupled to an antenna 604 for sending and receiving wireless signals from a wireless transceiver 266 or within the second SOC 204. The antenna 604 and wireless transceiver 266 and/or second SOC 204 may support communications using various RATs, including Cat.-M1, NB-IoT, CIoT, GSM, and/or VoLTE.

An IoT device 600 may also include a sound encoding/decoding (CODEC) circuit 610, which digitizes sound received from a microphone into data packets suitable for wireless transmission and decodes received sound data packets to generate analog signals that are provided to a speaker to generate sound in support of voice or VoLTE calls. Also, one or more of the processors in the first and second SOCs 202, 204, wireless transceiver 266 and CODEC 610 may include a digital signal processor (DSP) circuit (not shown separately).

Some IoT devices may include an internal power source, such as a battery 612 configured to power the SOCs and transceiver(s). Such IoT devices may include power management components 616 to manage charging of the battery 612.

Figure 7:
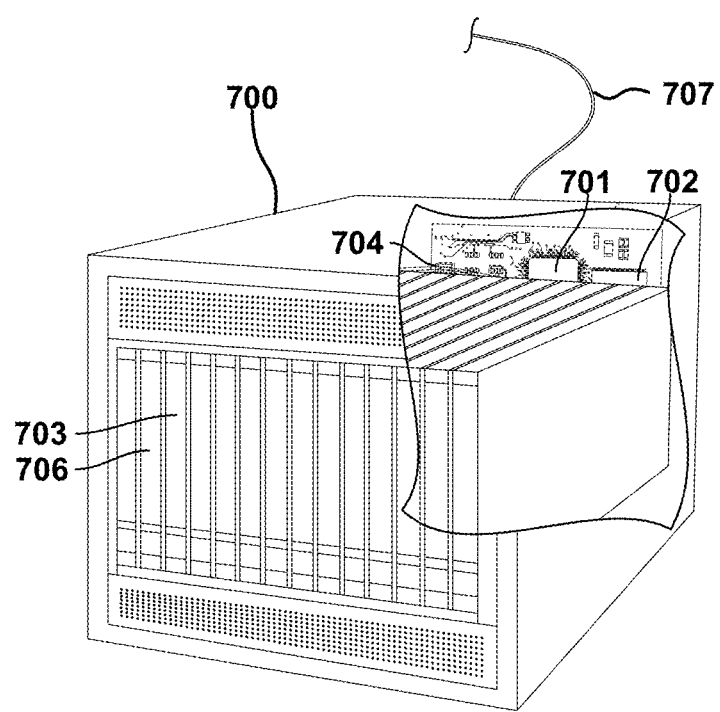
FIG. 7 is a component diagram of an example server suitable for use with the various embodiments

The various embodiments (including, but not limited to, embodiments discussed above with reference to FIGS. 1-18) may also be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disc drive, compact disc (CD) or digital versatile disc (DVD) drive 706 coupled to the processor 701. The server 700 may also include one or more network transceivers 704, such as a network access port, coupled to the processor 701 for establishing network interface connections with a communication network 707, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

The processors used in any embodiments may be any programmable microprocessor, microcomputer or multiple processor chip or chips that can be configured by software instructions (applications) to perform a variety of functions, including the functions of the various embodiments described in this application. In some IoT devices, multiple processors may be provided, such as one processor dedicated to wireless communication functions (e.g., in SOC 204) and one processor dedicated to running other applications (e.g., in SOC 202). Typically, software applications may be stored in the internal memory 220, 258, 606, before they are accessed and loaded into a processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on an IoT device and the IoT device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (IDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting device management in Fifth Generation (5G) New Radio (NR) connectivity for Internet of Things (IoT) devices, comprising:
    indicating, by a processor in an IoT device, in a connectivity monitoring object of the Lightweight Machine-to-Machine (LwM2M) protocol transmitted to a base station whether the IoT device is capable of receiving 5G NR;
    receiving, by the processor, 5G parameters that include 5G NR network bearer support information from the base station; and
    using, by the processor, the received 5G parameters to add support for 5G non-standalone (NSA) or 5G standalone (SA) objects to the LwM2M protocol.

2. The method of claim 1, wherein:
    the connectivity monitoring object transmitted to the base station includes a network bearer information element and an available network bearer information element; and
    receiving the 5G parameters that include the 5G NR network bearer support information from the base station further comprises receiving information identifying a network bearer type or a communication session that can be established with the base station.

3. The method of claim 1, wherein indicating in the connectivity monitoring object of the LwM2M protocol transmitted to the base station whether the IoT device is capable of receiving 5G NR further comprises including a 5G-NR cellular network information element in the transmitted connectivity monitoring object.

4. The method of claim 1, wherein indicating in the connectivity monitoring object of the LwM2M protocol transmitted to the base station whether the IoT device is capable of receiving 5G NR further comprises including in the connectivity monitoring object at least one or more of:
    a 5G-NR frequency division duplexing (FDD) cellular network information element; or
    a 5G-NR time division duplexing (TDD) cellular network information element.

5. An Internet of Things (IoT) device, comprising a processor configured with processor-executable instructions to:
    indicate in a connectivity monitoring object of the Lightweight Machine-to-Machine (LwM2M) protocol transmitted to a base station whether an IoT device is capable of receiving Fifth Generation (5G) New Radio (NR);
    receive 5G parameters that include 5G NR network bearer support information from the base station; and
    use the received 5G parameters to add support for 5G non-standalone (NSA) or 5G standalone (SA) objects to the LwM2M protocol.

6. The IoT device of claim 5, wherein:
    the processor is configured with processor-executable instructions such that the connectivity monitoring object transmitted to the base station includes a network bearer information element and an available network bearer information element; and
    the processor is configured with processor-executable instructions to receive the 5G parameters that include the 5G NR network bearer support information from the base station by receiving the 5G parameters that further include information identifying a network bearer type or a communication session that can be established with the base station.

7. The IoT device of claim 5, wherein the processor is further configured with processor-executable instructions to indicate in the connectivity monitoring object of the LwM2M protocol transmitted to the base station whether the IoT device is capable of receiving 5G NR by including a 5G-NR cellular network information element in the transmitted connectivity monitoring object.

8. The IoT device of claim 5, wherein the processor is configured with processor-executable instructions to indicate in the connectivity monitoring object of the LwM2M protocol transmitted to the base station whether the IoT device is capable of receiving 5G NR by including in the connectivity monitoring object at least one or more of:
    a 5G-NR frequency division duplexing (FDD) cellular network information element; or
    a 5G-NR time division duplexing (TDD) cellular network information element.

9. An Internet of Things (IoT) device, comprising:
    means for indicating in a connectivity monitoring object of the Lightweight Machine-to-Machine (LwM2M) protocol transmitted to a base station whether the IoT device is capable of receiving Fifth Generation (5G) New Radio (NR);
    means for receiving 5G parameters that include 5G NR network bearer support information from the base station; and
    means for using the received 5G parameters to add support for 5G non-standalone (NSA) or 5G standalone (SA) objects to the LwM2M protocol.

10. A base station configured to communicate with Internet of Things (IoT) devices, the base station comprising:
    a base station processor configured with processor-executable instructions to:
        receive from an IoT device one or more Fifth Generation (5G) New Radio (NR) network bearer support information elements in a connectivity monitoring object of the Lightweight Machine-to-Machine (LwM2M) protocol indicating whether the IoT device is capable of receiving 5G NR;
        transmit 5G parameters that include 5G NR network bearer support information to the IoT device, the 5G parameters providing support for 5G non-standalone (NSA) or 5G standalone (SA) objects to the LwM2M protocol; and
        provide 5G NR service to the IoT device.

11. The base station of claim 10, wherein the base station processor is configured with processor-executable instructions such that:
    the connectivity monitoring object received from the IoT device that indicates whether the IoT device is capable of receiving 5G NR further includes a network bearer information element and an available network bearer information element; and
    transmitting the 5G parameters that include the 5G NR network bearer support information further include information identifying a network bearer type or a communication session that can be established with the base station.

12. The base station of claim 10, the base station processor is configured with processor-executable instructions such that receiving from the IoT device one or more 5G NR network bearer support information elements in the connectivity monitoring object of the LwM2M protocol indicating whether the IoT device is capable of receiving 5G NR further comprises receiving 5G-NR cellular network information element in the connectivity monitoring object.

13. The base station of claim 10, the base station processor is configured with processor-executable instructions such that receiving from the IoT device one or more 5G NR network bearer support information elements in the connectivity monitoring object of the LwM2M protocol indicating whether the IoT device is capable of receiving 5G NR further comprises receiving at least one or more of:
- a 5G-NR frequency division duplexing (FDD) cellular network information element; or
- a 5G-NR time division duplexing (TDD) cellular network information element.

\* \* \* \* \*